United States Patent

[11] 3,593,906

[72] Inventor Paul Hug
Mountain View, Calif.

[21] Appl. No. 801,081
[22] Filed Feb. 20, 1969
[45] Patented July 20, 1971
[73] Assignee International Business Machines Corporation
Armonk, N.Y.

[54] CONDUCTOR HANDLING AND BONDING SYSTEM
9 Claims, 12 Drawing Figs.

[52] U.S. Cl. .......... 228/1, 156/73, 228/4
[51] Int. Cl. .......... B23k 1/06, B23k 5/20
[50] Field of Search .......... 156/73; 228/1, 4, 3, 2, 5, 19, 6

[56] References Cited

UNITED STATES PATENTS

| | | | |
|---|---|---|---|
| 3,053,124 | 9/1962 | Balamuth | 228/1 |
| 3,382,564 | 5/1968 | Gallentine | 228/4 |
| 3,430,834 | 3/1969 | Laub | 228/1 |
| 3,436,006 | 4/1969 | Cole | 228/1 |
| 3,437,093 | 4/1969 | Williamson | 156/73 |
| 3,464,102 | 9/1969 | Soloff | 156/73 |
| 3,477,119 | 11/1969 | Smith | 228/1 |

*Primary Examiner*—John F. Campbell
*Assistant Examiner*—Donald P. Rooney
*Attorney*—Fraser and Bogucki

ABSTRACT: A system for positioning and attaching small conductors to precise locations on a densely packed circuit board utilizes an ultrasonic-bonding element, within the tip of which are incorporated elements of very small mass for manipulating and controlling the conductor without affecting the bonding operation. Such elements comprise a pair of slidable grippers and a pair of slidable wedge elements disposed within an elongated recess extending along one side of the bonding element. Dependent upon the relative positions of the gripper elements and the wedge members to each other in the bonding tip, as externally controlled, the gripper members may be extended outwardly to secure a conductor, retract the conductor for bonding, and then release the conductor.

INVENTOR
PAUL HUG

BY *Fraser and Bogucki*
ATTORNEYS

INVENTOR.
PAUL HUG

BY *Fraser and Bogucki*

ATTORNEYS

INVENTOR.
PAUL HUG

BY Fraser and Bogucki
ATTORNEYS

INVENTOR.
PAUL HUG
BY Fraser and Bogucki
ATTORNEYS

CONDUCTOR HANDLING AND BONDING SYSTEM

BACKGROUND OF THE INVENTION

1. Field of the Invention

This invention relates to automatic and manual systems for attaching conductors to circuit boards or other elements, and more particularly to devices and mechanisms for positioning and bonding conductors onto densely packed circuit boards using ultrasonic energy.

2. History of the Prior Art

Numerous tools and devices for automatic attachment of conductors to circuit boards and circuit components are known, but these do not generally meet the requirements of modern high-density systems. In data-processing systems and other electronic systems utilizing integrated circuits, it is necessary to make interconnections between different circuit boards, and preferably to do so very compactly, consistent with the densities attainable with integrated circuit technology. In a specific example, a special interconnection board is used having many of the order of 100 contact pads per square inch. Interconnections between these pads are made by individual conductor loops. Automatic systems have been developed for selection and handling of appropriate conductor loops, which are thereafter to be bonded to the circuit board at the selected points. Such functions may be conducted under fixed programs or under computer control.

It is evident that a given conductor loop can be prepared, positioned and thereafter bonded to selected circuit pads solely by an operator using commercially available bonding devices common to the integrated circuit industry. Such bonding techniques as resistance welding, compression bonding, and laser beam or electron beam welding can be utilized. It is preferred for many applications, however, to use an ultrasonic bonder, because such systems are capable of working in confined spaces and providing an adequately secure bond in a relatively short time and at low cost.

Ultrasonic bonders incorporate a bonding arm or horn excited by an ultrasonic transducer, and having a bonding tip at or adjacent the free end of the bonding arm, and extending toward the circuit board or element to which bonding is to be effected. For best bonding, the excitation of the tip should be at a selected frequency, although any substantial mass affixed to the bonding horn or the tip tends to change the resonant frequency and to cause losses in the bonding energy. In working with extremely densely packed circuit boards, a separate system can be used for holding the conductors in position during bonding, but only at the expense of a completely separate positioning control system, and considerable mechanical complexity in order to avoid the introduction of unwanted mass into the system.

These problems are further complicated, in some instances, by the fact that coaxial conductors are often used for signal transmission, both to eliminate capacitance effects and to satisfy increasingly stringent speed requirements. Devices and systems capable of bonding single wire conductors to other elements are often inherently unsuited to meet the requirements imposed by coaxial lines.

SUMMARY OF THE INVENTION

Positioning and bonding systems in accordance with the invention utilize an integral system within the bonding tip of an ultrasonic-bonding tool, by disposing small slidable members in a portion of the bonding tip itself. Small coacting gripper and wedging members are disposed within a recess in the bonding tip, and movable into different positional relationships, so as to maintain positive control of a conductor during all phases from initial gripping to final bonding.

In a specific example of a system in accordance with the invention, a coaxial conductor to be bonded to a circuit board is supplied in proximity to the bonding tip of an ultrasonic bonder controllable with respect to the two coordinates of a circuit board. A pair of elongated gripper elements are disposed centrally within an elongated recess along one side of the bonding tip and extend outwardly from the bonding tip in the direction of the circuit board. The interior sides of the free ends of the gripper members include conductor-gripping recesses, and when free of restraint the grippers curve outwardly so as to receive the conductor. Each of the different ones of the pair of wedging members is disposed on an opposite side of the pair of gripper members within the recess, and also longitudinally slidable along the recess. Reciprocating movement of the wedging members exerts positive control over the gripper members as well. In a first position of movement, the free ends of the gripper members are extended from the bonding tip and open outwardly to receive the conductor to be bonded. The gripper members engage the conductor by downward movement of the wedging members, which brings the tips of the gripper members into a second position. Thereafter the gripper and wedging members are retracted into the bonding tip, which is lowered into bonding position with both conductors of the coaxial line in position on the circuit pads. The force exerted by the bonding tip retains these elements in position, while the wedging member may be withdrawn to release the grippers and permit bonding to be effected without mechanical constraint on the conductor.

BRIEF DESCRIPTION OF THE DRAWINGS

The foregoing and other objects, features and advantages of the present invention will be apparent from the following more particular description of the invention, as illustrated by the accompanying drawings, in which:

FIG. 6, comprising

DETAILED DESCRIPTION OF THE INVENTION

Figure 1:
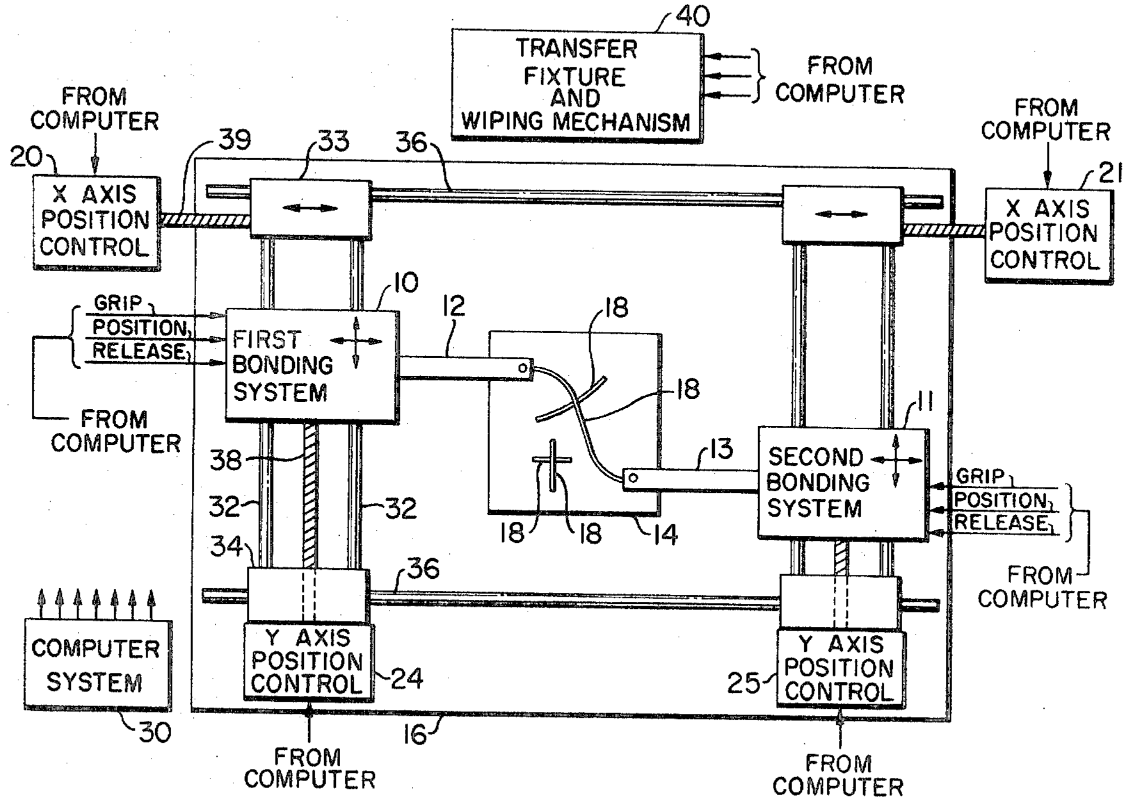
FIG. 1 is a combined block diagram and plan view of a positioning and bonding system.

In one example of utilization of systems and devices in accordance with the invention, first and second bonding systems 10, 11 are utilized under computer control to receive, position and bond small, densely packed coaxial conductors to a circuit board. Each bonding system 10, 11 has a separate bonding horn 12, 13 respectively, disposed in a direction extending toward a circuit board 14 which is held in position on a frame 16 by suitable means, such as a mechanical fixture or a vacuum holddown mechanism. The conductors 18 are to be attached between predetermined circuit pads at designated X, Y coordinates on the circuit board 14, but these positions may be wholly arbitrary. For convenience of reference only, the horizontal coordinate, as viewed in FIG. 1, is referred to herein as the X-axis, and the vertical coordinate is referred to as the Y-axis. Ordinarily, the bonding systems 10, 11 are movable in two mutually orthogonal directions, but this is in fact not a necessary condition.

Each bonding system 10, 11 has separate X-axis position controls 20, 21 and Y-axis position controls 24, 25 operated under command of a computer system 30. A conventional X-Y positioning system is utilized, and only one system need be described briefly inasmuch as the systems are in this instance identical. The first bonding system 10 is slidably mounted so as to be movable by the Y-axis position control 24 on rails 32 extending along the Y-axis. The rails 32 are seated in sliders 33, 34, each of which rides on a separate X-axis rail 36. Thus, the X-axis position control 20 drives the carriage along the X-axis rails 36 so as to position the bonding horn 12 in the X-axis position, while the Y-axis position control 24 drives the bonding system 10 along the carriage so as to position the horn 12 relative to the Y-axis. These positioning systems may be of any conventional type, such as those now used in numerical control, graphical plotting, or other position control systems for position control in at least two mutually orthogonal directions. While stepping motors, AC or DC servomotors or a variety of other drives can be used, the practical example of the system being described incorporates the well-known "Slo-syn" type of drive, and utilizes lead screws 38, 39 for driving the bonding system 10 to the selected positions along the Y- and X-axes respectively.

Each bonding system 10, 11 receives signals to control its operating bonding cycle, as well as its position, from the computer system 30. These signals are applied in a controlled cyclic fashion to different mechanisms within the bonding system 10 or 11, and for descriptive purposes have been designated the "grip," "position," and "release" signals respectively.

A transfer fixture and wiping mechanism 40 which is also under control of the computer system 30 automatically performs the preparative steps which alternatively may be performed manually. Inasmuch as the sequence is significant in terms of understanding the bonding operation, it will be described in some detail even though the transfer fixture and wiping mechanism 40 will not be so described. For each given connection that is to be made on the circuit board 14, a given length of coaxial conductor 18 is prepared. In these preparatory steps, each end of a coaxial conductor 18 is treated in the same way. The outer conductor is stripped back from the end of the inner conductor for a given length, and a short pigtail lead is added, parallel to the protruding inner conductor, so that both the outer conductor and inner conductor may be affixed to the circuit board.

Gripping members on the transfer fixture and wiping mechanism 40 clamp to the opposite ends of a looped conductor and move these to a feed position adjacent the frame 16. The terminal parts of the loop are bent at a selected angle, here about 30°, and each end of the loop is disposed in a selected position, for seizure by the positioning and bonding device.

Figure 2:
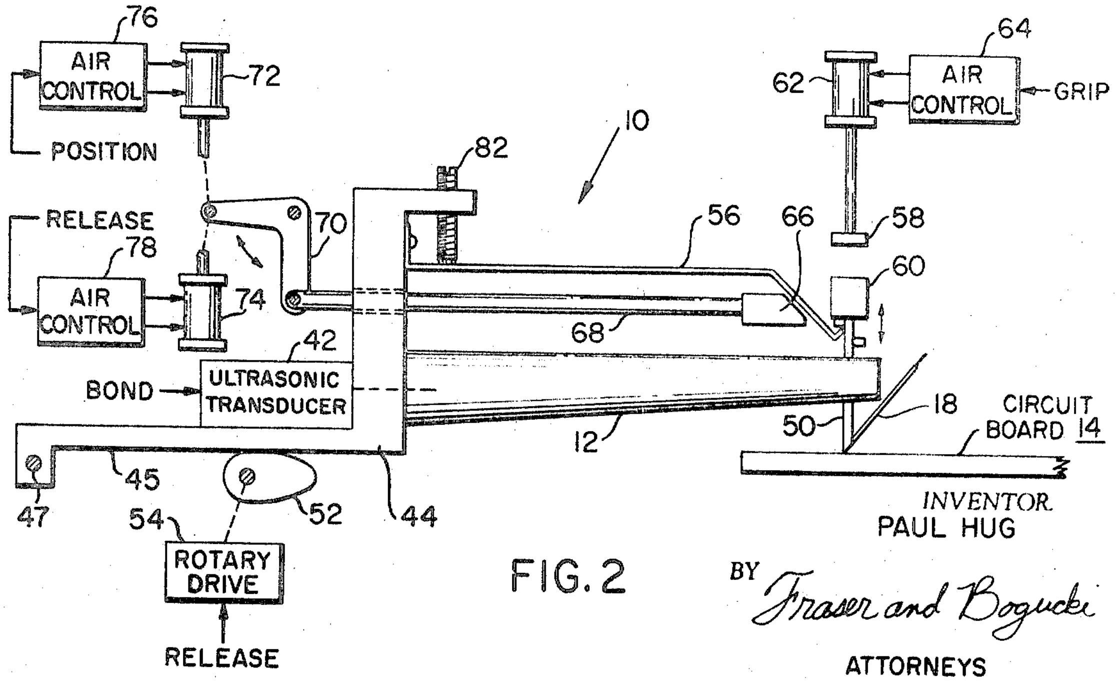
FIG. 2 is a combined block diagram and side view of a positioning and bonding system in accordance with the invention.

A bonding system is illustrated in more detail and in somewhat diagrammatic form in FIG. 2. In FIG. 2, the bonding system 10 comprises principally a tapered bonding horn 12 disposed substantially parallel to a high-density circuit board 14, and an ultrasonic transducer 42 in energy transfer relationship to the bonding horn 12. Each coaxial conductor to be attached to the board 14 is to have its center conductor affixed at each end to a different selected circuit pad on the board, with the ground line of the conductor being bonded to an adjacent segment such as a ground plane.

The bonding horn 12 is mounted on a bracket 44 which is rigidly mounted on the frame for the bonding system 10. The bracket 44 includes an elongated lever arm 45 which rotates about a pivot 47 journaled in the bonding system frame. A bonding tip 50 positioned adjacent the free end of the bonding horn extends in a direction perpendicular or substantially perpendicular to the circuit board 14, and is in energy transfer coupling to the bonding horn 12. When moving the bonding tip 50 to given X-, Y-coordinates, the bonding tip is raised out of contact with the circuit board 14 by a cam 52 which engages the lever arm 45. A controlled rotary drive 54 rotates the cam 52 under computer control so that the bonding tip 50 is raised out of contact with the circuit board and the other conductor loops, or lowered into position against the board 14.

Figures 3, 4, 5:
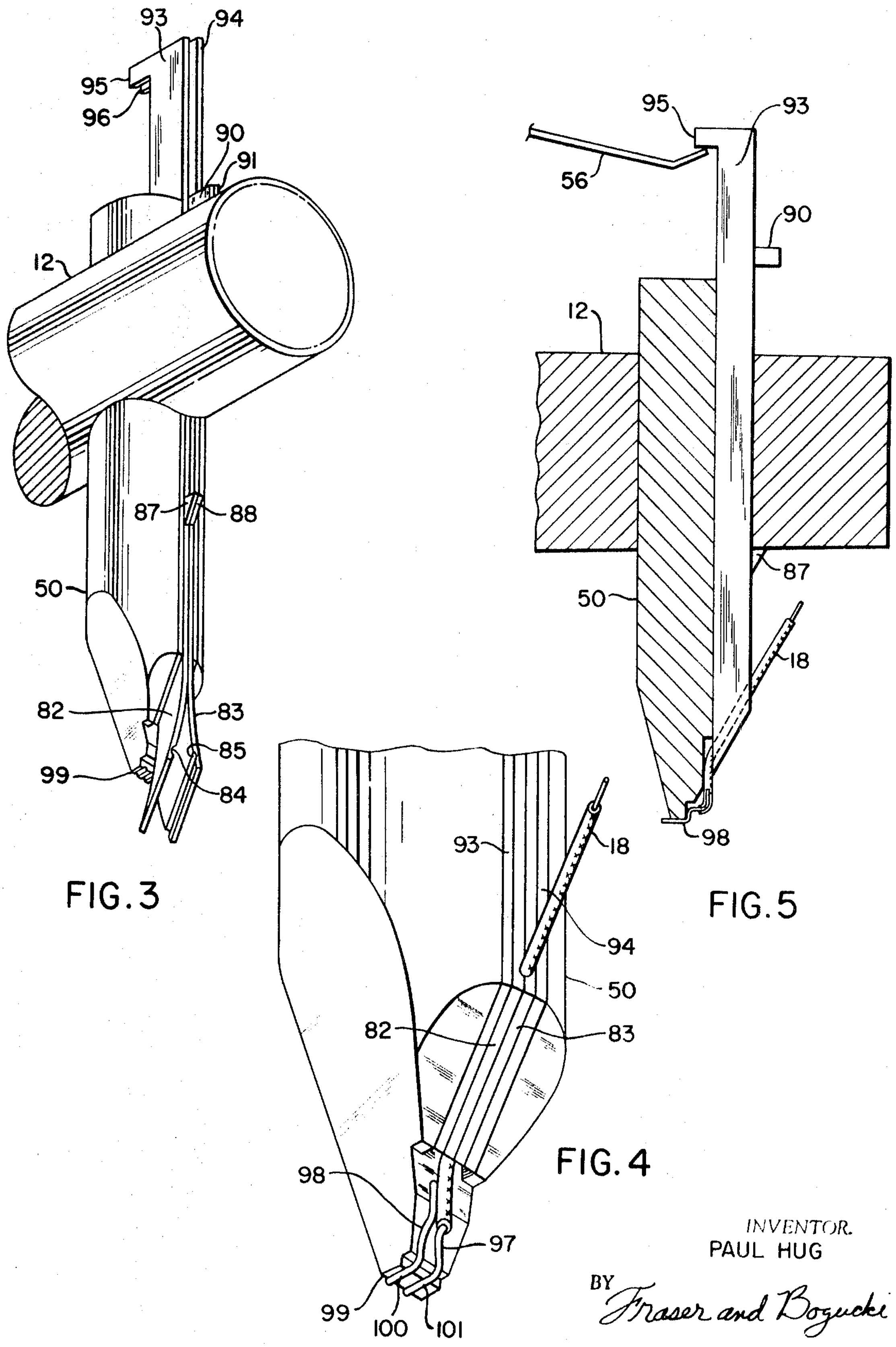
FIG. 3 is an enlarged fragmentary perspective view of the bonding tip in the system of FIG. 2, showing further details thereof in one operative position.
FIG. 4 is a fragmentary perspective view of the bonding tip of FIG. 3, showing a different operative position.
FIG. 5 is a side sectional view of the bonding tip of FIGS. 3 and 4.

A gripping and release system, incorporated within the bonding tip 50, and described in conjunction with FIGS. 3—5, is slidably movable along the bonding tip 50, under control of a cantilever leaf spring mounted in the bracket 44, and a piston 58 adjacent the bonding tip 50. The free end of the spring engages a portion of the gripper mechanism at the opposite end of the bonding tip 50 from the circuit board 14, and the piston 58 acts against a buffer element 60 which also engages a portion of the gripper mechanism, both of these units being described in greater detail below. The piston 58 is however moved up and down by a first air cylinder 62 actuated by a first air control 64 responsive to "grip" signals from the computer system 30. The leaf spring 56 includes an angled portion against which bears a slider element 66 disposed at the free end of a slider arm 68 movable within the bracket 44 from one arm of a bellcrank 70. The bellcrank 70 is rotatably mounted on the bonding system 10 frame, and its other arm is engaged by and driven by either one of two linear motion generators. In this specific example, second and third air cylinders 72, 74 respectively are mechanically coupled to the bellcrank 70 to provide different extents of movement. The second air cylinder 72 is operated by a second air control 76 in response to the "position" signal, and the third air cylinder 74 is operated by a third air control 78 in response to the "release" signal. Other forms of linear motion devices might be utilized for this purpose, if desired.

The normal or rest position of the leaf spring 56 is controlled by an adjustment screw 82 mounted in the bracket 44 and adjustable so as to insure a spacing between the leaf spring 56 and the bonding tip 50 when at rest.

The fragmentary views of FIGS. 3, 4 and 5 show further details of the particular arrangement of the bonding tip 50 in accordance with the invention. FIG. 3 is a perspective, enlarged view which shows the bonding tip 50 protruding from the bonding horn 12 in a direction normal to the bonding horn 12, this generally being substantially perpendicular to an associated circuit board (not shown). Elongated gripper elements 82, 83 within a keyway along the forward surface of the bonding tip 50 comprise a pair of resilient strip elements of generally rectangular cross section. The ends of the gripper elements 82, 83 tend to spring outwardly at a selected acute angle relative to each other when free of mechanical constraint. The interior faces of the gripper elements include conductor gripper recesses 84, 85 for receiving and encompassing a conductor 18. These recesses are at an angle of approximately 30° to the vertical axis of the bonding tip 50. Lower limit stops for the gripper members 82, 83 are defined by a pair of protruding tabs 87, 88 respectively which extend outwardly from the bonding tip 50 at a selected intermediate point along the length of the gripper members 82, 83. Upper limit stops comprise a second pair of protruding tabs 90, 91 respectively which are at or adjacent the upper ends of the gripper members 82, 83 at predetermined positions.

Between each opposite side of the pair of gripper members 82, 83 within the keyway in the bonding tip 50, is disposed a different one of a pair of elongated wedge members 93, 94, comprising elongated rectangular strips slidably movable along the keyway under external control. The coefficient of friction between the gripper members 82, 83 and wedge members 93, 94 is such that the gripper members 82, 83 move concurrently with the wedge members 93, 94 when the latter are driven up or down. Tabs 95, 96 at the upper ends of the wedge members 93, 94 respectively are engaged by the spring member 56 (FIGS. 2 and 5) to move the wedge members 93, 94 to two different operative positions during the operating cycle of the mechanism. The buffer element 60 (FIG. 2 only) is connected to the tabs 95, 96 of the wedge members 93, 94.

In FIGS. 4 and 5, a coaxial conductor 18 is shown in bonding position. The center conductor 97 and pigtail ground conductor 98 are curved around the bonding face 99 of the bonding tip 50, within semicircular positioning recesses 100, 101.

The operation of the system of FIG. 2, externally controls the gripping and bonding elements shown in greatly enlarged form in FIGS. 3, 4 and 5 and in the sequential views represented in FIG. 6, comprising FIGS. 6A through 6D. A repetitive cycle is defined, in which there are four distinct positions of operation, although certain of these may be combined or performed virtually concurrently. The system of FIG. 2 is shown at an intermediate position, which may be taken as the bonding position. In general, however, as shown in the four successive views of FIG. 6, each complete cycle entails the four distinct movements of the gripper and wedge members in the bonding tip, these being effected under external control from the associated computer system 30 (FIG. 1). Accordingly, description of the operation requires reference to the detailed views of FIG. 6 as well as the bonding tip mechanism described above in conjunction with FIGS. 3, 4 and 5.

In the first position of operation within the cycle, an immediately prior positioning and bonding operation has been completed, and the gripper members 82, 83 are to be made ready for reception of a new conductor 18. As described above in conjunction with FIG. 1, the bonding system 10 or 11 is moved adjacent the transfer fixture and wiping mechanism 40, with the bonding tip 50 being held out of engagement with the circuit board 14 and the associated conductors 18 by operation of the rotary drive 54. Upon reaching the position at which the bonding system 10 or 11 is to receive the appropriate end of a new conductor, the "grip" signal is applied from the computer system 30 of FIG. 1 which actuates the first air control 64 and the first air cylinder 62 to drive the associated piston 58 downwardly against the buffer element 60. The piston 58 drives the buffer element 60 through what may be termed a full travel, forcing the wedge members 93, 94 downwardly. The gripper members 82, 83 are frictionally restrained and also move downwardly. Upon reaching the downward limit, the gripper members 82, 83 are restrained because the upper limit stops 90, 91 engage the bonding horn 12. In the downward movement, the elements reach the first position, shown in FIG. 6A, in which the gripper members 82, 83 are caused to protrude outwardly at the limit position and the wedge members 93, 94 are within the bonding tip 50. The springing action of the free ends of the gripper members 82, 83 causes them to open so as to receive the conductor 18.

Figure 6A:
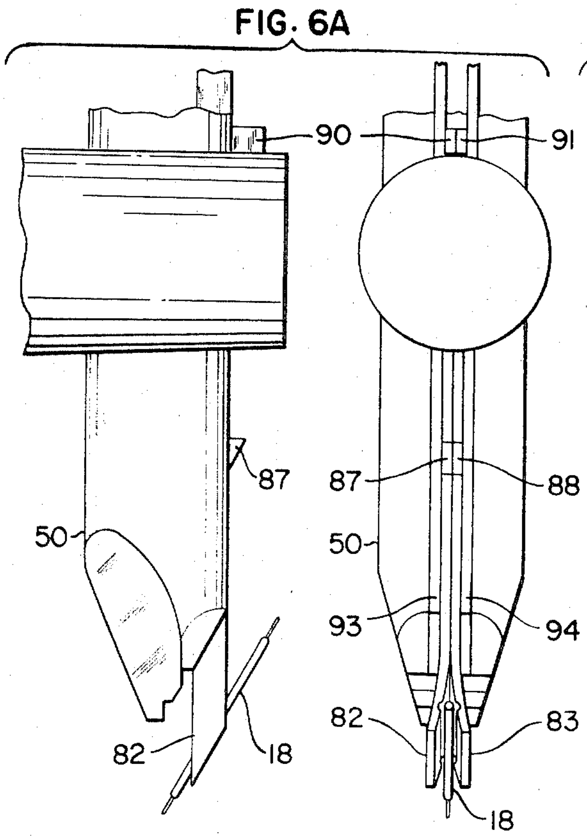
FIGS. 6A through 6D, represents successive positional relationships of the wedging and gripping members in a cycle of operation of the bonding tip.
Figure 6B:
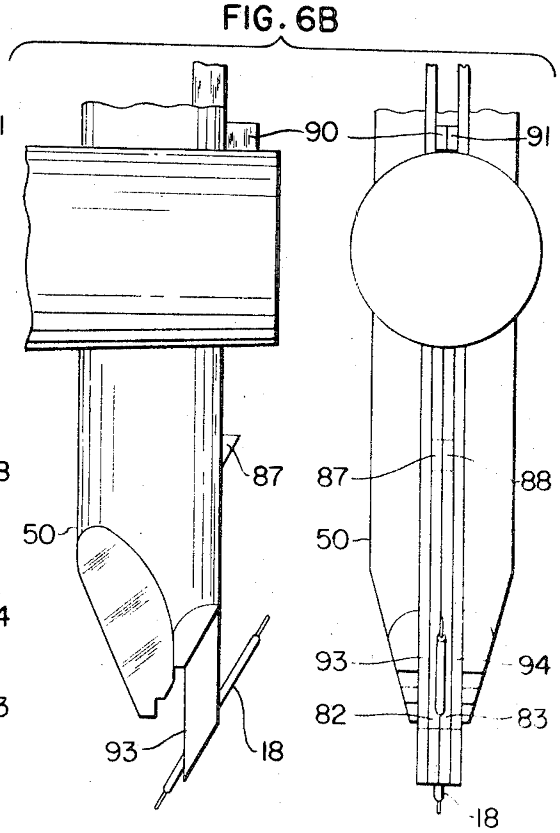

Thereafter, as the downward movement of the wedge members 93, 94 continues, the terminal portions of the gripper members 82, 83 are forced inwardly until the conductor 18 is sized and retained within the recesses 84, 85 on the internal faces of the gripper tips forming the second position shown in FIG. 6B. Thus, two distinct positions are realized even though the actions of extending the gripper tips and seizing the conductor 18 are completed in response to the single operation of the first air cylinder 62.

With the conductor 18 gripped into position, the bonding tip 50 may be moved to the desired coordinates for attachment of the conductor, as discussed above in conjunction with FIG. 1. Concurrently, or after reaching the selected coordinates, the gripping and wedge members may be moved to the third position shown in FIG. 6C. To effect this operation, the second air cylinder 72 is activated by the "position" signal through the second air control device 76. The mechanical coupling between the second air cylinder 72 and the bellcrank 70 rotates the bellcrank 70 through a first angular amount. The slider element 66 is driven against the resilient arm 56 to move the tabs 95, 96 of the associated wedge members 93, 94 upwardly. The gripper members 82, 83 are also moved upwardly to the third position. At this position, the lower stops 87, 88 on the gripper members 82, 83 are in contact with the bonding horn 12 and the conductor 18 is retained within the gripper members 82, 83.

Figure 6C:
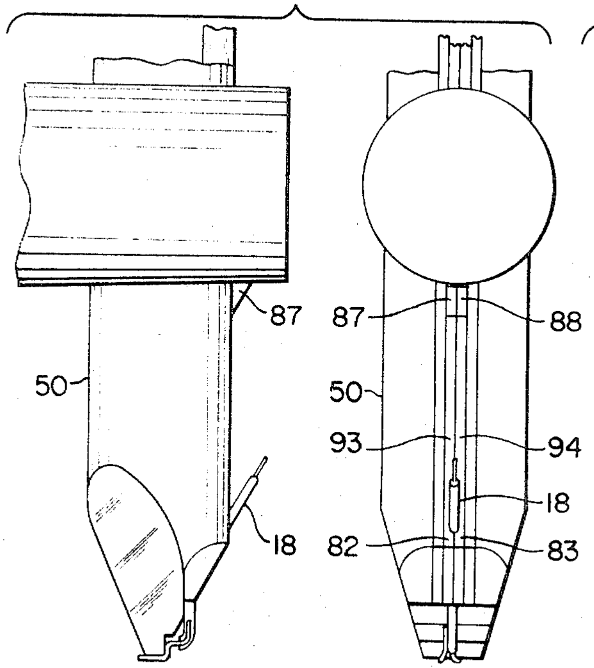
Figure 6D:
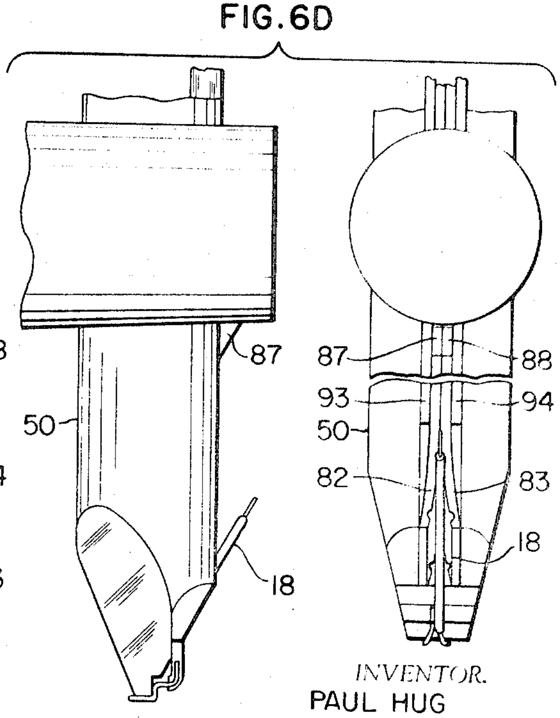

Bonding may be effected by the application of ultrasonic energy virtually concurrently with the arrival at the third position shown in FIG. 6C or after the gripper members 82, 83 are released from the conductor 18 by proceeding to a fourth position of operation within the cycle, as shown in FIG. 6D. The "release" signal is used to energize the third air control 78 to actuate the third air cylinder 74 and to rotate the bellcrank 70 through a second angle, greater than the first angle of movement, so as to cause the slider element 66 to move the resilient arm 56 upwardly to a fourth position. In this position, the wedge members 93, 94 are fully retracted within the keyway in the bonding tip 50. The lower limit stops 87, 88 on the gripper members 82, 83 prevent further upward movement of the gripper members 82, 83. Thus, the ends of the gripper members 82, 83 are freed to spring outwardly, and consequently do not restrain the conductor during or after bonding.

Application of a signal to the ultrasonic transducer 42 excites the bonding tip 50 for a predetermined interval of time. The completion of a given cycle may be determined by any conventional means, such as an internal timing circuit, a cam operated timer or like arrangement, and therefore has not been shown. The rotary drive 54 can also be arranged to respond to the bond signal as well as to operate for a given interval of time, retaining the bonding tip in contact against the circuit board 14 for the predetermined interval before automatically raising the tip 50 from the board 14.

At the completion of the bonding, the bonding horn 12 is then raised and the cycle of operation is completed, so that the mechanism is again ready to receive a new conductor end.

It will be appreciated that the mechanism thus described operates on the basis of frictional and mechanical constraints and therefore requires no separate mechanisms in contact with the gripper and wedge members, to add to the mass of the system and reduce the bonding efficiency. A total mass of only 0.05 grams is introduced in one practical example of the system, and the mechanism is substantially no greater in size than the preexisting bonding tip itself. Consequently, any conductor device that may be handled by the existing unit may also be secured, positioned and bonded by devices in accordance with the invention.

Figure 7A:
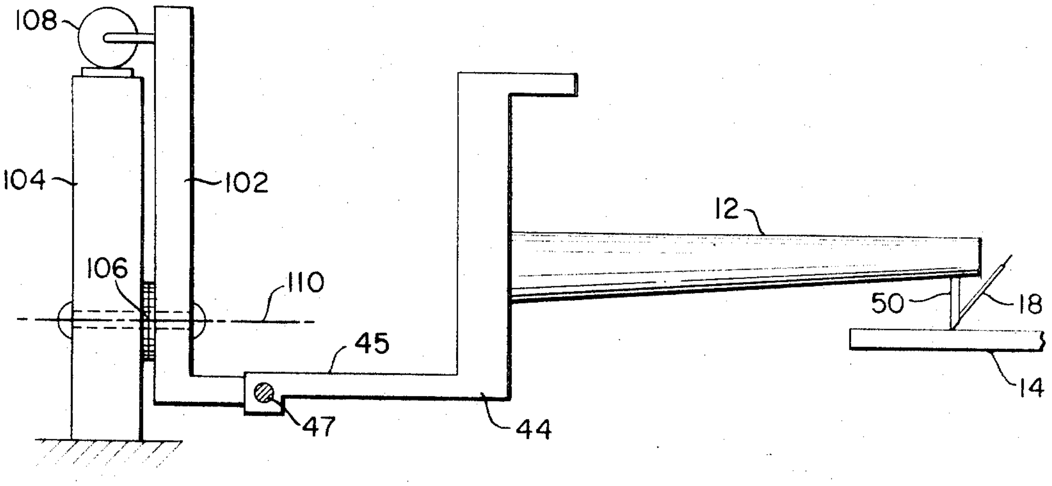
FIG. 7A is a simplified side view of a first alternative arrangement of a bonding system in accordance with the invention.
Figure 7B:
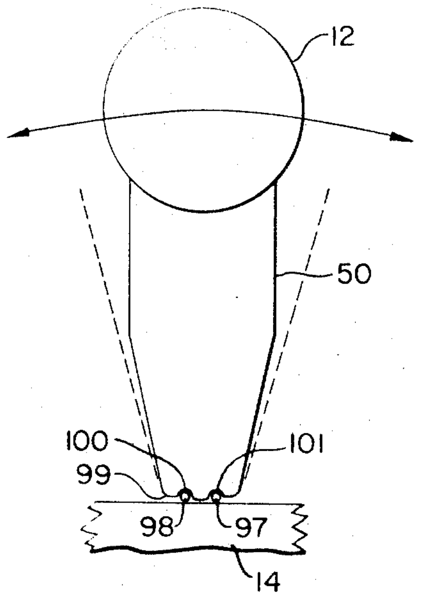
FIG. 7B is a simplified end view of the arrangement of FIG. 7A.

FIGS. 7A and 7B illustrate one alternative arrangement in accordance with the invention, in which a rocking mechanism is incorporated in the bonding device and two or more conductors are separately bonded. Due to energy transmission and other factors, a single conductor bond generally needs less bond energy than two conductors bonded concurrently by a single bonding tip. The device of FIGS. 7A and 7B uses a single bonding tip 50 but permits high-bonding strengths to be attained with less energy.

The arrangement shown in FIG. 7A is similar to that shown in FIG. 2, and only the support bracket 44, lever arm 45, bonding horn 12 and lower portion of the bonding tip 50 are shown therein for simplicity. In addition, however, the lever arm 45 is mounted at the pivot point 47 to the lower extension of a first frame member 102. The first frame member 102 is rotatably mounted on a second frame member 104 at a pivot point 106, and an air cylinder 108 mounted at the top of the second frame member 104 is coupled to pivotably rotate the first frame member 102 and associated bonding system about a generally horizontal axis 110 through the pivot point 106 and lying within the plane of the drawing.

As shown in FIG. 7B, the end surface 99 of the bonding tip 50 incorporates recesses 100, 101, as formerly, but is curved to permit rocking of the bonding tip 50 relative to the circuit board 14. The tip 50 is rocked between two position, shown in phantom lines and exaggerated in FIG. 7B under the control of the air cylinder 108 shown in FIG. 7A. In a first one of the two rocking positions, the center conductor 97 is bonded and in a second one of the positions the pigtail ground conductor 98 is bonded, only one of the conductors 97, 98 being bonded at a time.

Figure 8:
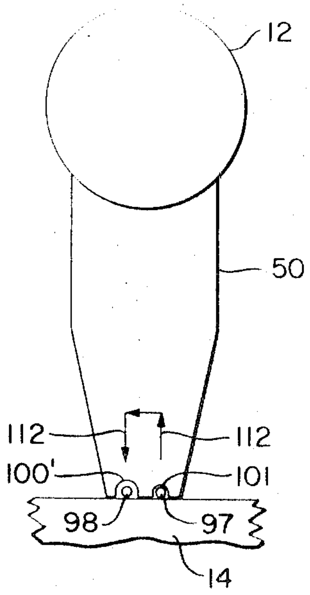
FIG. 8 is a simplified end view of a second alternative arrangement of a bonding system in accordance with the invention.

FIG. 8 depicts yet another alternative arrangement, in which the semicircular positioning recess 101 in the bonding tip 50 is as shown in FIG. 4 but the other recess 100 (here designated 100′) is of larger size (shown exaggerated in FIG. 8). The recess 101 conforms to the shape of the conductors 97, 98 and therefore effects a bond of full strength. As the conductor 97 is firmly bonded to the circuit board 14, the conductor 98 is lightly tacked to the board 14 via the enlarged recess 100'. Thereafter, the computer commands a slight shifting of position of the bonding tip 50 as shown by the arrows 112 in FIG. 8, to place the bonding recess 101 on the lightly tacked conductor 98, whereupon the conductor 98 is firmly bonded to the circuit board 14.

While the invention has been particularly shown and described with reference to preferred embodiments thereof, it will be understood by those skilled in the art that the foregoing and other changes in form and detail may be made therein without departing from the spirit and scope of the invention.

What I claim is:

1. A vibratory-bonding system for bonding conductors to miniature circuit boards including:

vibratory energy-transmitting means including a bonding tip having an elongated recess therein;

gripper means disposed within and slidably movable along the elongated recess in said bonding tip; and means disposed in frictional contact with said gripper means for slidably moving said gripper means relative to said bonding tip.

2. The invention as set forth in claim 1 above, wherein said gripper means comprise elongated, generally planar elements disposed in contact with one another along a substantial portion of the lengths thereof and having adjacent resilient tip portions which tend to curve outwardly from each other, and said means in frictional contact comprise elongated, generally planar wedge elements disposed within the recess on opposite sides of the gripper means.

3. The invention as set forth in claim 1 above, wherein said bonding tip has a pair of recesses therein for positioning the different ones of a pair of conductors adjacent a circuit board, and further including means for rocking the bonding tip relative to the circuit board between first and second positions, one of the pair of recesses in the bonding tip holding one of the pair of conductors in contact with the circuit board to bond said one conductor to the board when the bonding tip is in said first position, and the other one of the pair of recesses in the bonding tip holding the other one of the pair of conductors in contact with the circuit board to bond said other conductor to the board when the bonding tip is in said second position.

4. The invention as set forth in claim 1 above, wherein said bonding tip has a pair of recesses therein one of which is configured to hold a conductor in relatively tight contact with a circuit board and the other recess of which is larger than said one recess and is configured to hold a conductor in relatively loose contact with the circuit board, means for initially positioning first and second conductors between the circuit board and the one and the other recess in the bonding tip respectively to tightly bond the first conductor to the board while substantially simultaneously lightly bonding the second conductor to the board, and means for thereafter positioning the bonding tip with said other recess over the second conductor to tightly bond the second conductor to the board.

5. A device for bonding electrical conductors to minute circuit pads on a circuit board comprising:

an elongated ultrasonic energy-transmitting horn having a first end positionable at selected positions relative to the circuit board;

transducer means coupled and transmitting ultrasonic energy to said horn;

a conductor-gripping device mounted at said first end of said horn and extending normally thereto toward the circuit board, said device including a pair of elongated gripper members movable in a direction substantially normal to the circuit board and having a pair of internal recessed gripping surfaces for receiving a conductor therein, said device further including a pair of elongated wedging members disposed adjacent said gripper members and movable in a direction substantially normal to the circuit board;

means for sliding said gripper members relative to said horn; and means for sliding said wedging members relative to said horn.

6. A device for bonding electrical conductors to minute circuit pads on a circuit board comprising:

an elongated ultrasonic energy-transmitting horn having a first end positionable at selected positions relative to the circuit board;

transducer means coupled and transmitting ultrasonic energy to said horn at a region spaced apart from said first end;

an energy-transmitting tip coupled to said first end of said horn and extending in a direction substantially normal to the circuit board, said tip including a longitudinal recess therealong on one side thereof;

a pair of elongated gripper members disposed within the recess in said tip, said gripper members being of resilient material, curving outwardly at the ends thereof closest to the circuit board, and including internal conductor receiving notches disposed in facing relation adjacent the ends thereof closest to the circuit board and means for limiting the longitudinal movement thereof within said recess;

a pair of elongated wedge members disposed within the recess in said tip, said pair of wedge members being disposed on opposite sides of said gripper members within said recess and in frictional engagement therewith, said wedge members and gripper members being longitudinally slidable within said recess with a sliding fit; and means for reciprocating said wedge members along said recess.

7. The invention as set forth in claim 6 above, wherein said means for reciprocating said wedge members along said recess includes tab elements extending from said wedge members, and control means engaging said tab elements for establishing a first position in which said gripper members are extended outwardly from said recess with said wedge members retracted within said recess, a second position with said wedge members extended from said recess to force the curved ends of said gripper members together, thereby to grip a conductor within the notches in said gripper members, a third position with both said wedge members and said gripper members retracted into said recess, with said wedge members maintaining said gripper members in locked relation relative to the conductor, and a fourth position with said wedge members further retracted into said recess to free said conductor from said gripper members.

8. A system for attaching a conductor to a miniature circuit board comprising:

a positioning system controllable in two coordinates relative to the circuit board;

an ultrasonic-bonding system controlled by said positioning system, said ultrasonic-bonding system including an extended horn substantially parallel to the circuit board, and a bonding tip directed substantially normal toward said circuit board;

means coupled to said extended horn for maintaining said bonding tip in one or the other of two positions at a selected coordinate relative to said circuit board, including a first position in which said bonding tip is out of engagement with said circuit board and a second position in which said bonding tip is mechanically in engagement with said circuit board;

means disposed substantially within said bonding tip for drawing a conductor against said bonding tip, said means having a relatively small mass, being capable of releasing said conductor when said bonding tip is in said second position and including a pair of gripper members slidably disposed within a slot in said bonding tip and a pair of wedge members slidably disposed within the slot in said bonding tip; and means out of engagement with said bonding horn for controlling said last mentioned means.

9. A device for bonding electrical conductors to minute circuit pads comprising:

an elongated ultrasonic energy-transmitting horn having a first end positionable at selected positions relative to the circuit board;

transducer means coupled and transmitting ultrasonic energy to said horn at a region spaced apart from said first end;

a conductor-gripping device mounted at said first end of said horn and extending normally thereto toward an associated circuit board, said gripping device comprising a fixed hollow sleeve member, a pair of movable elongated gripper members disposed within said sleeve member centrally thereof, said gripper members initially extending outwardly from said sleeve member in the direction of the circuit board and including a pair of internal recessed gripping surfaces for receiving a conductor therein, and a pair of elongated restraint members slidably mounted in said sleeve member between said gripper members and said sleeve member;

means for sliding said gripper members relative to said sleeve member; and means for sliding said restraint members relative to said sleeve member.